United States Patent [19]

Johnson et al.

[11] 4,334,752
[45] Jun. 15, 1982

[54] METHOD OF CAMERA MANUFACTURE AND CAMERA APPARATUS

[75] Inventors: Bruce K. Johnson, Andover; Fred M. Finnemore, North Reading, both of Mass.

[73] Assignee: Polaroid Corporation, Cambridge, Mass.

[21] Appl. No.: 211,333

[22] Filed: Nov. 28, 1980

[51] Int. Cl.³ .................... G03B 17/02; G03B 13/02
[52] U.S. Cl. .................................. 354/288; 354/219
[58] Field of Search ............... 354/288, 202, 219, 150, 354/151

[56] References Cited

U.S. PATENT DOCUMENTS

| | | | |
|---|---|---|---|
| 2,303,208 | 11/1942 | Gehrke | 354/219 |
| 2,936,685 | 5/1960 | O'Brien et al. | 354/219 |
| 3,836,985 | 9/1974 | Lange | 354/288 X |
| 3,893,135 | 7/1975 | Matsui et al. | 354/197 X |
| 3,961,349 | 6/1976 | Forsyth et al. | 354/286 X |
| 3,979,762 | 9/1976 | Hendry et al. | 354/288 |
| 4,052,728 | 10/1977 | Hendry et al. | 354/288 X |
| 4,114,166 | 9/1978 | Driscoll et al. | 354/86 X |

FOREIGN PATENT DOCUMENTS

| | | | |
|---|---|---|---|
| 1081749 | 5/1960 | Fed. Rep. of Germany | 354/151 |
| 2740929 | 3/1979 | Fed. Rep. of Germany | 354/219 |
| 1042977 | 9/1966 | United Kingdom | 354/288 |

OTHER PUBLICATIONS

Research Disclosure, Nov. 1976, No. 151, pp. 54-55.

*Primary Examiner*—Donald A. Griffin
*Attorney, Agent, or Firm*—Leslie J. Payne

[57] ABSTRACT

A photographic camera is disclosed having a housing, and a plurality of operational components are mounted within the housing interior, wherein at least one of the components requires a final adjustment to alter its operation to the particular camera into which it is assembled. The housing includes an opening in one of the wall surfaces thereof in aligned relation to said one component so as to allow access thereto. For covering the opening, a panel is mounted on the housing wall surface in covering relation to said opening, whereby following assembly of the component and the housing into a substantially complete camera, the one component can be adjusted and then the panel mounted over the housing opening. A method of camera manufacture is also discussed.

3 Claims, 5 Drawing Figures

METHOD OF CAMERA MANUFACTURE AND CAMERA APPARATUS

BACKGROUND OF THE INVENTION

This invention relates to the photographic field. More particularly, it relates to a method of manufacturing a photographic camera apparatus as well as the apparatus itself.

A wide variety of techniques for assemblying cameras are known. One extremely successful kind has been proposed in commonly assigned U.S. Pat. Nos. 3,979,762 and 4,052,728. As disclosed therein, a group of modular sub-assemblies are attached to predetermined portions of a primary structure with snap-together type fasteners. Once constructed, these sub-assemblies form a completely enclosed modular photograhic unit ready for use. While the foregoing approach is successful, potential for problems exist.

For instance, the foregoing type of modular camera has a viewfinder sub-assembly which is attached to the primary structure during an intermediate assembly step. During subsequent assembly steps, however, the viewfinder lens element can become scratched or otherwise damaged.

This is a particularly significant problem when the lens elements are made of plastic. Obviously, this is undesirable not only because of the costs involved, but because the camera would have to be partially disassembled to replace the defective modular lens sub-assembly. Also, the foregoing type of camera requires testing and fine adjustment for certain of its operational components, such as the exposure calibration system or the shutter blade mechanism, before the camera is ready for marketing. For effecting such alterations, the camera's entire front wall cannot be covered. This thereby exposes much of the camera's interior components and increases the probability of inadvertent damage occurring during such altering.

Moreover, gaining access to the interior of such cameras for subsequently effecting repairs of later adjustments of these components requires removal of the entire front wall cover. Again, such removal exposes the entire interior to potential damaging influences even though it may be desired to work on only selected portions of the camera's components.

SUMMARY OF THE INVENTION

It is an object of the present invention to provide an improved method of manufacturing a camera and an improved camera apparatus which overcomes the potential drawbacks of the kind mentioned. For accomplishing this and other objects, there is provided a photographic camera having a plurality of operational components mounted interiorly of the housing. At least one of the components requires a final adjustment to alter its operation to the particular camera into which it is assembled. In an illustrated embodiment, the housing includes means defining an opening in one of the wall surfaces thereof in aligned relation to said one component so as to allow access thereto and a panel mounted on said housing wall surface in covering relation to the opening, whereby following assembly of the component and the housing into a substantially complete camera the component can be adjusted and the panel then mounted over the opening in the housing.

In one preferred embodiment, this housing defines means for maintaining a lens element over at least a portion of one of the openings. One of the covers is constructed for releasably maintaining the lens in engagement against the housing and has an opening therethrough in alignment with the lens. This permits lens assembly near the end of the assembly process. Consequently, potential damage to the lens is markedly minimized. Moreover, the housing is provided with a plurality of openings in the wall surface providing limited and selected access to the housing interior and a plurality of removable panels mounted on the housing wall allowing limited and selected access to the components for subsequent repair or alteration.

Among the other objects of the invention are, therefore, the provision of an improved method of manufacturing a camera; the provision of an improved photographic apparatus for facilitating camera manufacture; the provision of an improved camera housing having multiple removable panels permitting convenient access to different interior portions of the camera housing; the provision of an improved lens panel for securing the lens element in the housing at the end of the process.

Other objects and further scope of applicability of the present invention will become apparent from the detailed description to follow taken in conjunction with the accompanying drawings, wherein like parts are indicated by like reference numerals throughout the several views.

DETAILED DESCRIPTION

Figures 1, 2:
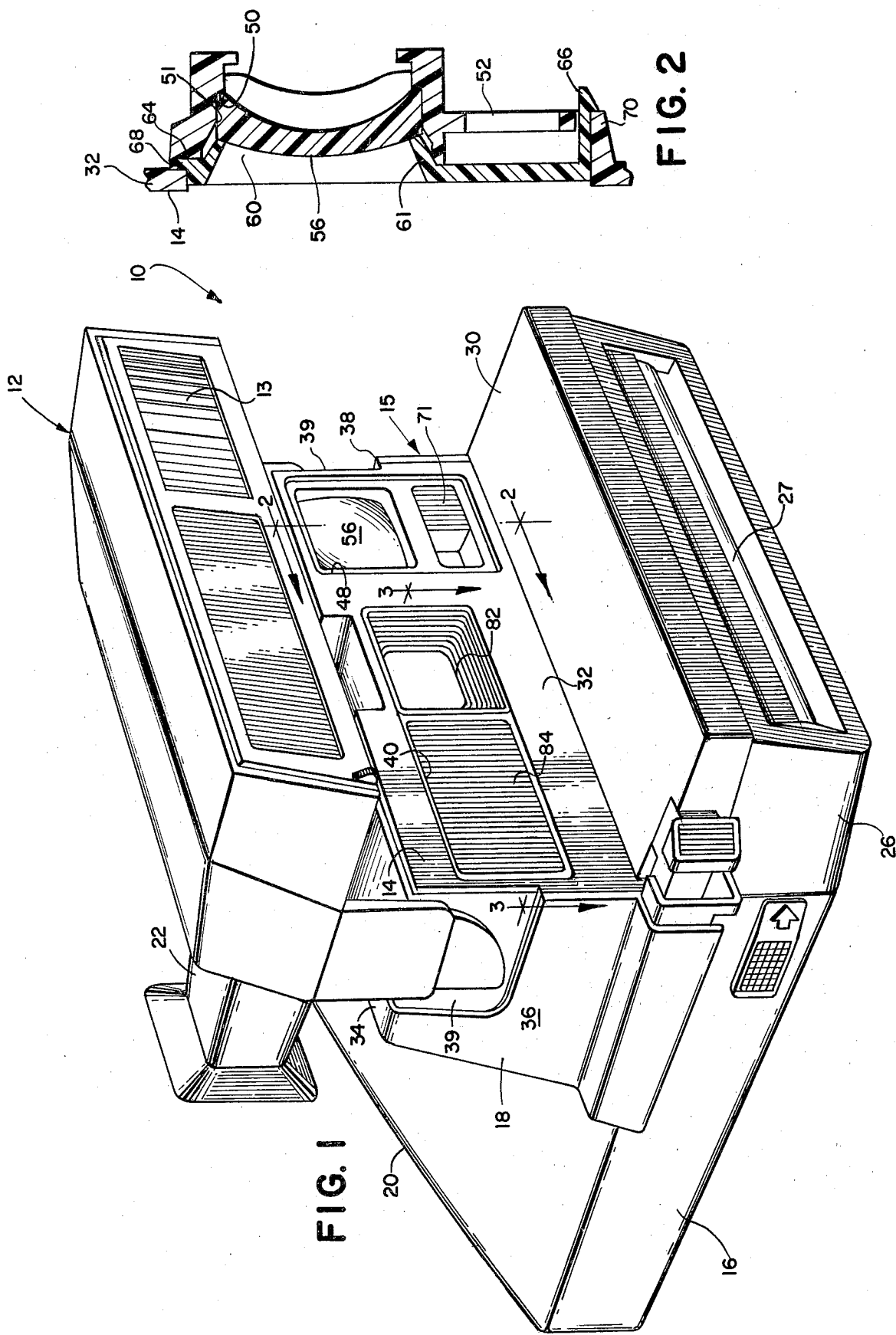
FIG. 1 is a perspective view illustrating a photographic apparatus incorporating the present invention.
FIG. 2 is a cross-sectional view taken along section line 2—2 appearing in FIG. 1.
Figure 3:
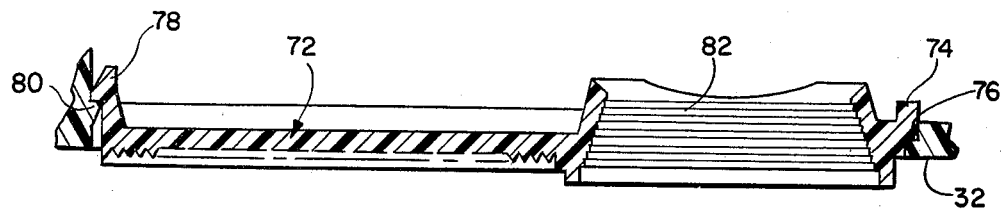
FIG. 3 is a cross-sectional view taken along section line 3—3 appearing in FIG. 1.
Figure 4:
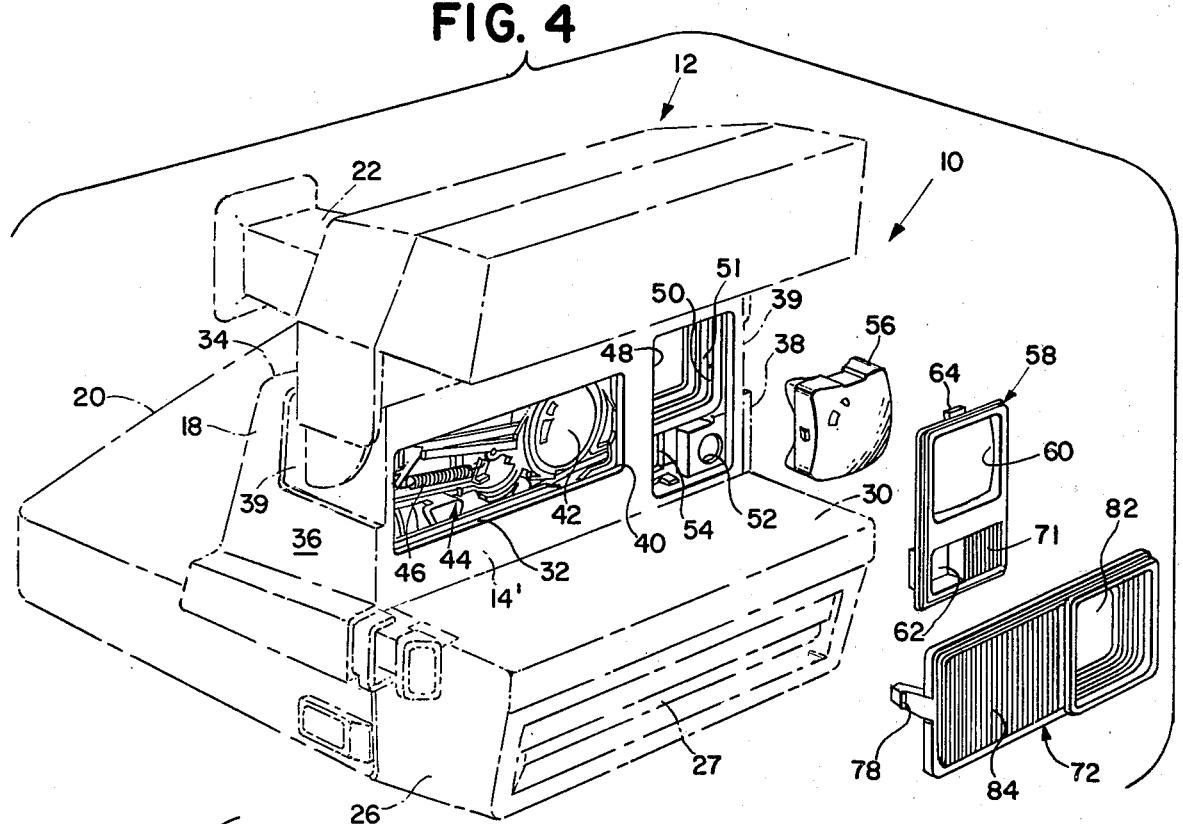
FIG. 4 is an exploded perspective view illustrating various components of the present invention in an unassembled condition; and, FIG. 5 is a fragmented elevational view taken of the rear of the removable panels forming the present invention.

Initial reference is made to FIGS. 1 and 4 for showing a camera apparatus 10 embodying the present invention. In the illustrated embodiment, the camera 10 is a compact, highly automated self-developing type utilizing a reflex or folded exposure optical path. Pivotally attached to the uppermost portion of the camera 10 is a foldable flash unit 12 of the electronic strobe type. This flash unit 12 is movable between an operative erect position (FIG. 1) and an inoperative, folded storage position (not shown). For a more detailed description of the depicted camera 10 and flash unit 12, reference is made to copending application Ser. No. 54,598, filed July 3, 1979, now issued as U.S. Pat. No. 4,268,146 which is assigned in common with the instant application. Since details of the camera 10 and flash 12 do not, per se, form an aspect of this invention, only details thereof necessary for an understanding of this invention will be given.

In the erect position, the flash unit 12 is positioned so that its light output is directed through flash window 13 into the camera's optical field of view. This provides supplemental transient illumination for facilitating exposure. In the inoperative or storage position, the flash unit 12 is arranged to nest over the forward portion of the camera 10. This latter arrangement provides a protective enclosure for the flash unit 12 as well as the forward camera wall surface 14. This protective nesting arrangement is more fully explained in the above-noted application.

With continued reference to FIGS. 1 and 4, there is shown a camera housing 15 having a generally parallelepiped base section 16 defining, in part, a film container or pack receiving chamber (not shown). Upwardly extending from the base section 16 is a forwardly facing housing section 18. Many of the camera's operational components associated with exposure control and processing operations are retained in the housing section 18 as will be described hereafter. In the rear of the housing section 18 is a rear housing section 20 for defining an exposure chamber (not shown). Associated with the housing section 20 is a rearwardly extending viewfinder lens tube 22. The exposure chamber receives a self-developing film pack (not shown) of the type holding a plurality of self-developing film units along with a battery for powering the camera's electrical system. A representative example of such a film pack for use in cameras of the above type is described generally in commonly assigned U.S. Pat. No. 3,877,045, issued on Apr. 8, 1975, to S. M. Bloom et al.

Pivotally coupled to the forward end of the base section 16 is a film loading door 26 including a pair of processing rollers (not shown). Normally, the film loading door 26 is in the illustrated closed position. When so positioned, the pressure applying rollers (not shown) are aligned with a film pack exit slot and an elongated film exit slot 27 formed in a front wall of the loading door 26. This construction allows for advancement of each of the film units in the pack exteriorily of the camera 10. For effecting loading and unloading of the film pack from the exposure chamber, the film loading door 26 is pivoted downwardly to an open position (not shown). This is accomplished after suitable movement of a slide latch button. When the door 26 is in the open position, the film pack can be inserted in or removed from the film pack receiving chamber. Extending forwardly of the housing section 18 is an apron 30 which protectively covers internal camera components.

Referring back to the housing section 18, it is defined, in part, by a front mounting wall 32, a top wall 34 extending rearwardly from the upper edge of the lens wall, and a pair of oppositely spaced side walls 36 and 38 joining the corresponding lateral edges of walls 32 and 34. Each of the side walls 36, 38 has a recessed flash unit mounting section 39.

Referring back to the front wall surface 14 formed on the wall 32, there is provided a generally rectangular access opening 40 (FIG. 4) configured for providing easy and selected access to objective lens 42, and shutter blade mechanism 44 including an adjustment spring 46 for regulating shutter speed. A second generally rectangular access opening 48 is provided adjacent the access opening 40. Formed inwardly of the front mounting wall 32 and defining part of the access opening 48 is a plurality of stepped mounting shoulders including mounting shoulders 50, 51 (FIGS. 2 and 4) which provide surfaces for locating and maintaining a viewfinder lens element in its preferred position as will be described later. Additionally formed by the housing 15 are a circular calibration window 52 (FIGS. 2 and 4), which allows access to and alteration of the exposure calibration system (not shown), and a photocell window 54 the latter being in optical alignment with a photocell (not shown) mounted in the interior of the housing 15 so that scene light may pass therethrough to the photocell. As best shown in FIG. 2, a viewfinder lens element 56 forming part of the viewfinder engages and is supported by the shoulders 50, 51 while the remainder of its body fits within the recess defined thereby (FIG. 2).

For continuously retaining the lens element 56 in its desired position, a removable viewfinder lens mounting panel 58 is provided. As best shown in FIGS. 1, 2 and 4, the panel 58 has a configuration generally complementary to the access opening 48. The viewfinder lens mounting panel 58 is a plastic member with a suitably configured viewfinder lens opening 60, lens engaging lip 61, a photocell opening 62, upwardly extending mounting tab 64 and opposite thereto a rearwardly extending flexible mounting finger 66. The viewfinder lens panel 58 is secured to the housing 15 by first inserting the mounting tab 64 into the recess 68 (FIG. 2) and then forcing the resilient and flexible finger 66 over the mounting ledge 70, extending rearwardly of the front mounting wall 32, until the inherent flexibility and resiliency of the finger allows it to have a snap-fit engagement with the ledge. When the panel 58 is secured, the lip 61 engages with the peripheral portions of the lens 56 for firmly maintaining the latter in the access opening 48, while the opening 60 is in optical alignment with the lens, and, of course, the photocell opening 62 is optically aligned with the photocell window 54. A portion of the viewfinder lens panel 58 covers the calibration window 52 to protect it. It will be understood that calibration of the exposure system will have occurred prior to the panel being mounted. In this manner, the exposure calibration system can be altered without the possibility of such alteration damaging other internal components or lens. It will be appreciated also that because of this panel 58 the lens 56 can be installed at or near the end of the camera assembly process. Advantageously, this minimizes the risk of damage to the lens 56 during assembly. Since the panel 58 can be removed from the housing 15, one can simply and easily again alter the calibration system or replace a damaged lens without the need to remove the entire front wall, as was done with other known housings. The foregoing features make for a camera which facilitates access to selected housed camera components. Again, it is emphasized that this enhances significantly manufacture of the camera as well as adjustments to its components.

Figure 5:
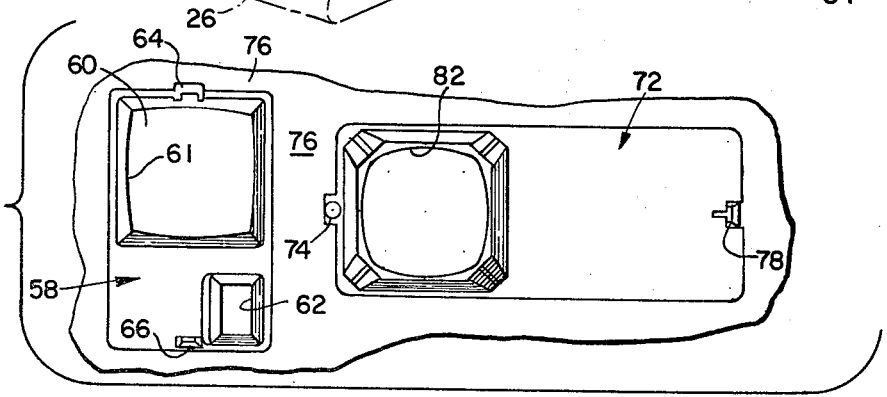

Reference is now made to removable access lens panel 72. This lens panel 72 is a plastic member configured to fit within and cover the access opening 40, when mounted to the front mounting wall 32 so as to have generally flush fit therewith. For securing the lens panel 72 to the wall 32, the former has an outwardly extending mounting tab 74 which, as is shown in FIG. 5, engages an interior surface 76 of the wall 32 when assembled. Longitudinally opposed to the mounting tab 74 is a retaining finger 78. The plastic material of the finger 78 is resilient and flexible enough to allow it to have a snap-fit connection to the ledge member 80 (FIG. 5) when the panel 72 is being forced into the access opening 40. Additionally, the lens panel 72 is formed with an objective lens opening 82 that is aligned with the objective lens 42. By reason of this lens panel 72, the shutter blade mechanism 44 including the shutter blade adjusting spring 46 are protected. Prior to final assembly, however, the spring 46 may be adjusted for obtaining any desired alterations necessary for desired shutter blade movement. Since access is limited to the shutter blade, such adjustments can occur in a manner reducing the likelihood of other components becoming damaged. Should the shutter blade mechanism 44 require adjustment or the objective lens 42 need replacing, the lens panel 72 can be removed for providing limited and selected access to the camera interior.

For decorative purposes, the viewfinder panel 58 and the lens panel 72 are provided with a textured surface 71 and 84; respectively.

By reason of the foregoing, the manufacture of the camera and specifically alteration of its components, which are required to be finally adjusted, can occur in a fashion minimizing damage to the camera's internal components. There is provided an arrangement facilitating limited, selected and repeatable access to predetermined interior components, without the necessity of removing major portions of the camera's housing and without the relatively greater attendant risk to these components. Furthermore, the foregoing construction facilitates assembly of the viewfinder lens in a manner greatly diminishing the likelihood of it being damaged during assembly.

Since certain changes may be made in the above-described apparatus without departing from the scope of the invention herein involved, it is intended that all matter contained in the description or shown in the accompanying drawings shall be interpreted as illustrative and not in a limiting sense.

What is claimed is:

1. In a photographic camera having a housing and a plurality of operational components mounted interiorly of said housing, at least one of said components requiring a final adjustment to alter its operation to the particular camera into which it is assembled prior to completion of camera assembly and another component being a lens located adjacent said one component and being mountable on said housing, the improvement wherein said housing includes means defining an opening in an exterior front wall surface of the camera and defining a portion for mounting the lens over a part of the opening and wherein said opening is in aligned relation to said one component so as to allow access to said one component and final adjustment thereof by a tool extendable through said opening, and a panel mounted on said housing front wall surface in covering relation to said opening, said panel having a lens opening in aligned relationship to said lens and being constructed to maintain the lens in the mounted condition when assembled, whereby following assembly of said components and said housing into a substantially complete camera, said one component can be finally adjusted by a tool extendable through said opening, and said panel then mounted in covering relation over said opening in said housing and to maintain the lens in the mounted condition.

2. A photographic apparatus comprising:
a housing defining at least a pair of openings, a plurality of operational components mounted interiorly of said housing, at least one of said components requiring a final adjustment to alter its operation to the particular camera into which it is assembled prior to completion of camera assembly, one of said openings allowing selected access and final adjustment to said one operational components and the other opening allowing access to a viewfinder assembly mounted interiorly of said housing;
said housing defining means for facilitating maintenance of a lens element thereagainst over a portion of said opening allowing access to the viewfinder assembly so as to be in alignment therewith;
a plurality of removable panels, each one constructed to generally cover a corresponding one of the openings whereby following assembly of said components and said housing into a substantially complete camera said one component can be finally adjusted by a tool and then one of said panels mounted in covering relationship, and having means for releasably securing each of said panels to said housing so that upon removal of said panels from the housing selected access can be had to the interior of the housing through each of said openings; and,
one of said panels being constructed to maintain the viewfinder lens element against said facilitating means, said one panel having a lens opening therethrough in general alignment with the maintained lens element when said one panel is secured to said housing.

3. A method of manufacturing a photographic camera so as to allow final alteration of selected operational components including one component requiring a final adjustment to alter its operation to the particular camera into which it is assembled prior to complete assembly of the camera and to permit installation of a lens element near completion of the camera assembly comprising the steps of:
providing a housing having a plurality of openings in the front wall surface thereof, the housing having means for facilitating mounting of a lens over one opening;
providing panels configured for mounting on said front wall surface in covering relation to ones of said openings;
providing a plurality of photographic components including one component requiring final adjustment for assembly in said housing, at least the one component being aligned with another one of the openings;
providing a lens element to be mounted on the mounting facilitating means over the one opening;
assembling said components and said housing to form a camera including mounting at least said one component interiorly of said housing and in aligned relation to the another one of said openings and said lens element being assembled in mounted and covering relationship to said one opening;
adjusting said one component through said another opening to alter said one component;
mounting one panel on said front wall surface in covering relation to said another opening; and,
mounting another panel having an aperture for the lens on said front wall to securely mount said lens to said front wall in alignment and covering relationship to said one opening.

* * * * *